Patented July 10, 1923.

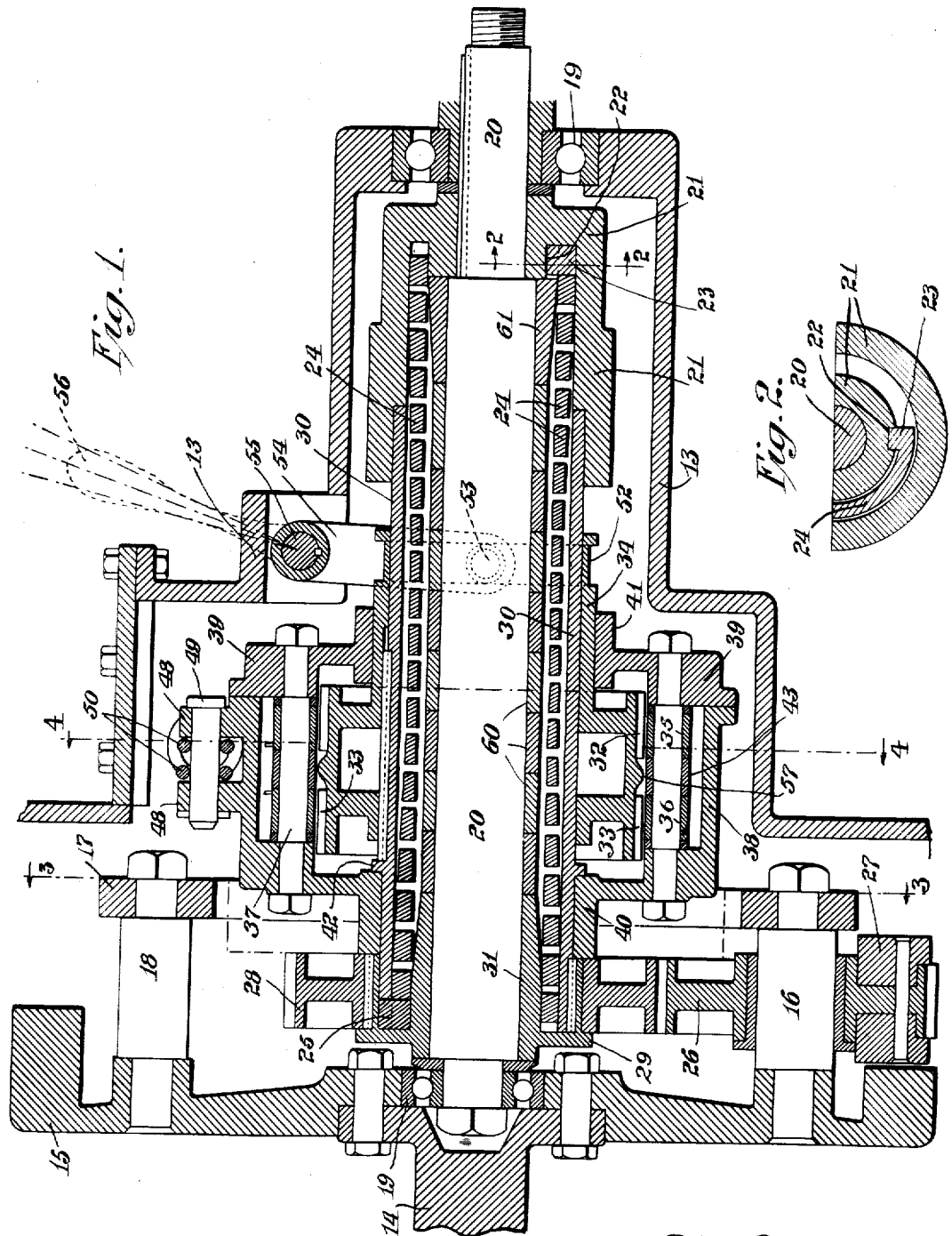

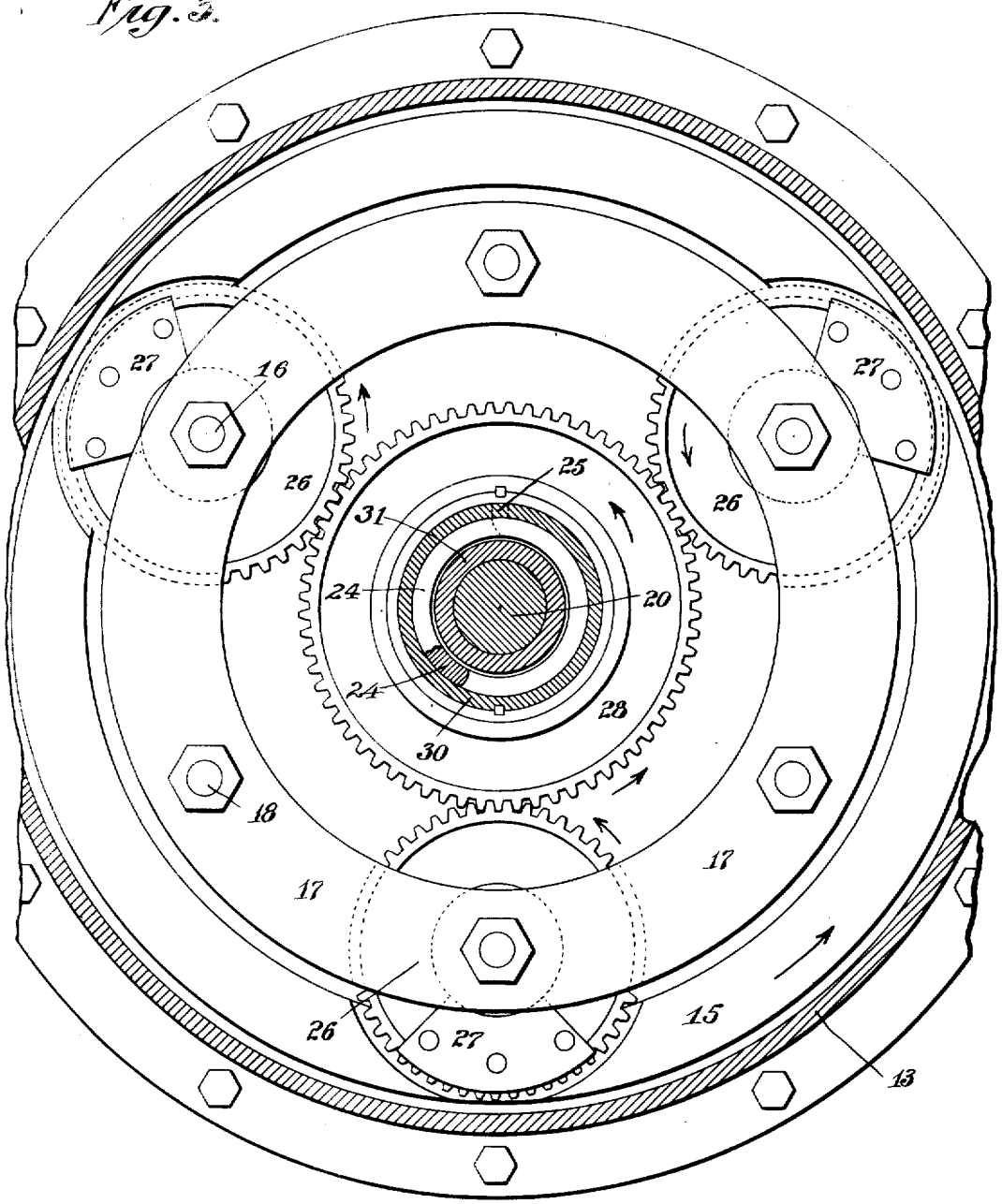

1,461,557

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

POWER TRANSMISSION.

Application filed January 25, 1922. Serial No. 531,591.

*To all whom it may concern:*

Be it known that I, JOHN REECE, a citizen of the United States, residing at Boston, in the county of Suffolk and State of Massachusetts, have invented certain new and useful Improvements in Power-Transmission, of which the following is a specification, reference being had therein to the accompanying drawing.

This invention is a novel power transmission apparatus adapted to use in various situations and for various purposes, for example, as a part of the power transmission mechanism of motor vehicles.

The general object is to provide an improved variable speed transmission for motor vehicles, and more especially to afford a mechanism by which the speed ratio between the engine and the driven parts may be regulated preferably semi-automatically to any desired point between the maximum and minimum. By semi-automatically we mean that once the control lever or pedal of the present invention is positioned for either forward or reverse driving, all future speeds may be regulated by merely opening or closing the throttle of the engine. My semi-automatic action becomes, when the parts are adjusted, wholly automatic, so that when a greater torque is required by the driven shaft than the engine is capable of transmitting, the speed ratio will be automatically reduced and the torque increased without any further operation on the part of the operator.

Other objects are to afford a mechanism in which, when running at full or normal speed, by which I mean at unit ratio, there will be required no internal motion or change of relation of the parts; also to give quietness and smoothness of action; to avoid the transmission from the engine to the driven parts of vibratory action in the engine; and to afford a simple and effective means of reversing the drive. Also it is an object to afford a transmission mechanism which can be utilized as a lock for preventing the vehicle or machine being moved; also one which will permit free running when set for either forward or reverse drive, for example, when it is desired to allow the car to run freely on a down grade, this being purely automatic in regard to the present invention. Another object is to permit a vehicle to be brought to a stop on an uphill without using a brake or stopping the engine. Other objects and advantages of the invention will be made clear in the hereinafter following description of one form or embodiment thereof, or will be obvious to those skilled in the art.

To the attainment of the objects and advantages mentioned, the present invention consists in the novel variable speed transmission and the novel features of combination, arrangement, mechanism, design, detail and method herein described or claimed.

Preliminarily it may be stated that my invention involves, in addition to the driving member, and the eventual driven member or shaft, an intermediate rotatable member which is connected in the manner to be described with both the driving and driven members. Associated with the intermediate rotatable member or between it and the driven shaft I introduce an elastic or spring connection, which is capable of acting as a reservoir of energy, such that a certain amount of irregularity or intermittency of motion or action in the intermediate member is permitted without materially affecting the steadiness of rotation of the driven shaft, but maintaining a substantially uniform force or torque thereupon. I also provide a certain yielding connection between the driving member and the intermediate member. This is a device of such nature and so arranged with relation to the driving and intermediate members, that at one part of the rotation or cycle of action the driving member, operating through the yielding device, urges forward the intermediate member, whereas at another period or stage of the action, and while the intermediate member is substantially stationary or anchored, the yielding member reasserting itself, applies its energy to a forward impulse on the driving member. In combination with these described elements, I employ a means for varying, either purely automatically to meet various road conditions, or at the will of the operator, the action or effect of the yielding connection, operating between the driving and intermediate members, in such a way as to enable the advance of the intermediate member, or rather its average rate of advance, which is irregular, to be increased or diminished. When the ratio is unity, all parts including the intermediate member, rotate together as a unit and without reciprocation or relative change of position. As will be seen, the mechanism is such as to enable forward driving, free-running, or reverse driving at will to be effected. Furthermore, when the control lever is positioned for either ahead or reverse driving, the torque is dependent upon the speed of the driving member due to the yielding centrifugal action of the weight or other device carried by same, as will be fully explained. Thus, the operator will control the speed of the machine and also the torque of the driven shaft by merely opening or closing the engine throttle, and in addition, if the torque required on the driven shaft is greater than that which the engine may transmit, the speed ratio will be automatically reduced. Furthermore, as the torque transmitted by the engine is proportionate to the square of the speed of same, it is obvious that on a very low speed of the engine almost no torque will be transmitted and, in consequence, the resistance is negligible and the engine cannot stall.

In the accompanying drawings Fig. 1 is a central vertical longitudinal cross-section of a power transmission apparatus embodying the present invention, adjusted with both ratchets held by their pawls, locking the intermediate and driven members against rotation.

Fig. 2 is a partial cross-section taken on the line 2—2 of Fig. 1.

Fig. 3 is a transverse section taken on the line 3—3 of Fig. 1, the arrows showing the direction of rotation assuming forward drive.

Figure 4:
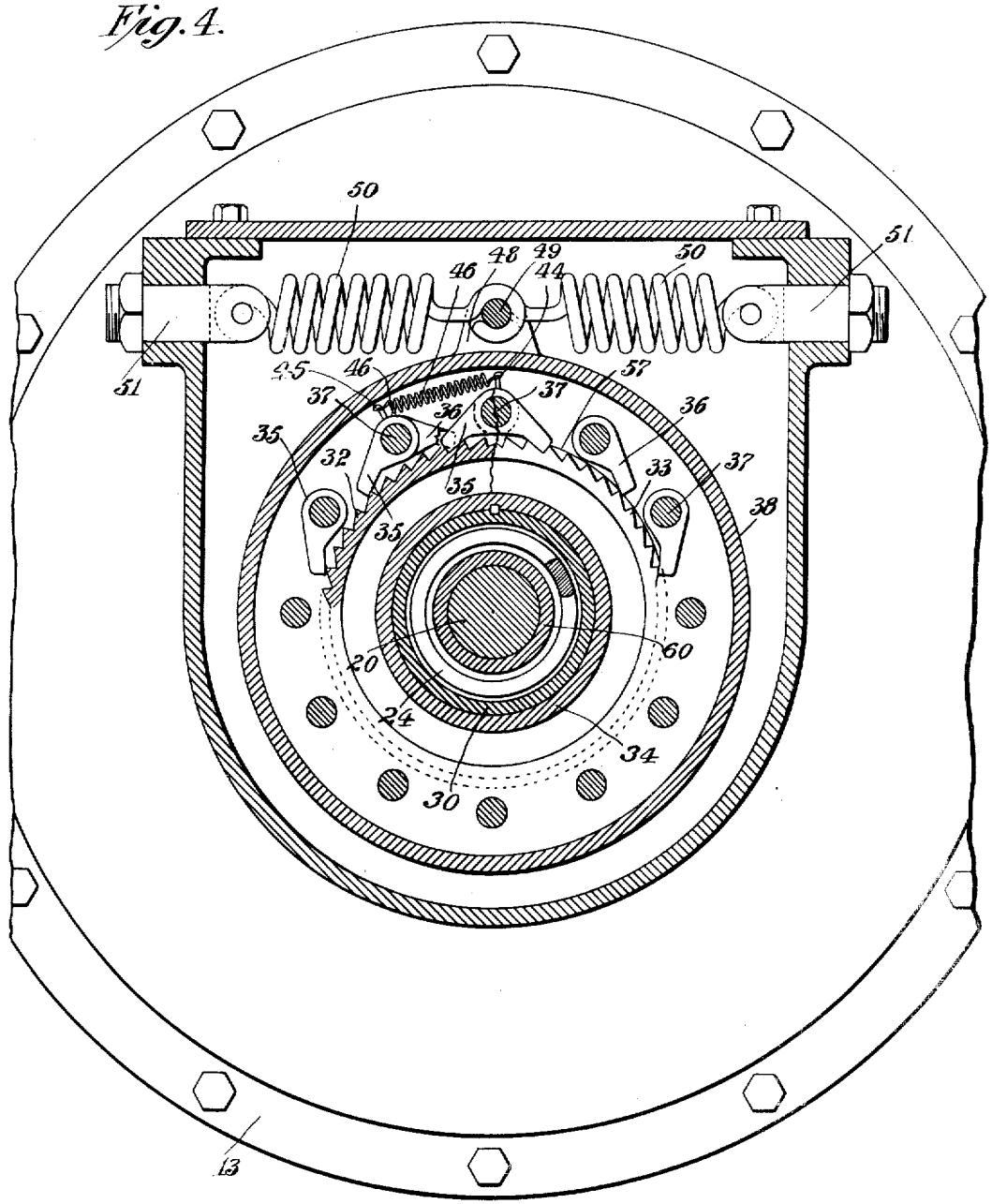
Fig. 4 is a transverse section taken on the line 4—4 of Fig. 1.

In part, this case is a continuation of my application Serial Number 364,897, filed March 11, 1920 for variable speed transmission, and the present case is in part an improvement over the earlier filed case. Instead of the hydraulic one-way device, serving the purpose of a pawl and ratchet, shown in the prior case, the present case employs a mechanical pawl and ratchet, of a particularly advantageous nature, to insure that the driven parts receive transmitted impulses only in one direction and not in the other. Various other novel features of construction and operation in the present case will be more fully pointed out. The prior case shows the general principles embodied in a motor vehicle, the drawings showing the mode of combining the invention with the vehicle, and these not being illustrated in the present case, reference may be made to the prior case for such details.

What may be termed the driving member of the present invention is shown as comprising the engine shaft 14 on which is secured the fly wheel or rotating disk 15. One or more studs 16 are shown mounted on the fly wheel, extending toward the right in Fig. 1, and the heads of these studs are interconnected by a ring 17. The studs 16 form bearings for the planetating parts to be described and there are preferably several of these, three being shown. Alternating with the three studs 16 are shown three bolts 18 also connecting the fly wheel disk 15 with the ring 17, giving added rigidity to the structure. These described elements 14 to 18 are all rigidly interconnected and may be referred to as an entity, namely, the driving member or element of the combination. Between the driving and driven members is a ball bearing 19, and a similar bearing is placed between the other end of the driven shaft and an exterior fixed casing 13.

The driven member of the combination comprises the driven shaft 20, in axial alinement with the driving shaft. A cylindrical part or barrel 21 surrounding the driven shaft has its hub keyed to the shaft so that the two are substantially rigid.

Within a small recess or notch 22 in the barrel 21 is fitted the head 23 of a transmitting spring 24, which is thus interposed between the driven member and the intermediate member to be described, so that when the latter is advanced irregularly, the spring may act as a reservoir for the transmitted energy, from which the driven shaft may receive the rotary energy in a steady or uniform manner. The spring is arranged surrounding the driven shaft and within the intermediate member, giving a compact construction yet with sufficient length of spring for the purposes described. The spring 24 has an enlarged head 25 at its left end engaging the intermediate member as will be described.

It will be understood that in operation the spring is under constant tension. The impulses transmitted by the intermediate member constantly increase or renew the tension of the spring as the energy is drawn therefrom by the driven member. The spring is of substantial strength yet of such length or construction that several complete turns are possible in putting the spring under full tension. It is obvious that when working at a heavy load the torque to be transmitted is far greater than when the apparatus is running light, and the spring will therefore wind up a greater amount with heavy load than with the light.

The spring 24 hereof is of a special structure for a certain purpose. The spring has different strength or weight at different parts or convolutions. It thus has the effect of a light spring coupled in series with a strong spring. For example, the convolutions may be graded in thickness, as clearly seen in Fig. 1, and the thinner or more yielding convolutions may be in the middle part as shown. The purpose of this is so that the spring may, at times of heavy load, have the action of a powerful spring, due to the thicker, stronger convolutions and the operation of a light spring when operating on a light load. If the entire spring were of the stronger character the actual angular yield would be quite small when the driven load is light. The consequence might be in some cases that during the intermittent period or phase when the spring is not having its tension increased by the intermediate member the driven member might overrun the spring, by rotating sufficiently to more than take up the angular tension or contraction of the spring; the result being that the forward pressure or torque on the driven shaft would momentarily cease or be reversed. It is important to maintain on the driven shaft a torque which is at least continuous if not entirely steady and uniform. With the illustrated spring the lighter convolutions insure the winding up of the spring by sufficient angular amount to avoid the possible overrunning of the spring by the driven shaft; it insures continuous forward torque on the driven shaft even at light loads.

The direction of the convolutions of the spring are such that when it is put under tension through the energy stored therein the effect is to contract the spring. Its diameter grows less, at first in the middle or lighter portions of the spring, with the result that after a certain angular motion these convolutions are brought into contact with the driven shaft or other parts inside the spring, thus rendering ineffective the lighter convolutions and, for the purposes of driving against a heavy load, thus in effect converting the spring into a heavy and powerful one, operating through its thicker convolutions. The spring is thus rendered self adjustable to the torque and load, in such a way that the total yield of the spring is maintained within practical limits, and is never too small or great for the purposes. Obviously a reverse twisting of the spring would expand it, and the same results could be obtained by limiting the expansion of the lighter convolutions; or the advantageous results of what I may term the "compound spring" may be secured in various other ways.

I have thus described the driving member of the combination, also the driven member, and the spring by which the energy is transmitted continuously to the latter. It will be understood that the driving member may be constantly rotated by the engine, usually at the same speed as the engine, but that such speed may vary according to conditions and may be controlled at the will of the operator, in the case of an internal combustion engine by means of the throttle. The present invention has to do—merely with the transmitting means between the driving member or fly wheel and the driven member or shaft. I will now describe the planetating, centrifugally controlled devices carried around with the driving member, by which the invention is actuated, and then the intermediate member, which is intermittently advanced by the centrifugal devices and which applies its impulses or intermittent transmissions of energy to the spring 24 from which, as described, the driven shaft continuously draws power.

Upon each of the planet studs 16 is a planet gear 26, this serving as a movable carrier for a centrifugal weight 27, one such weight secured on each of the wheels. The three planet gears engage and planetate about a central gear 28, which however is not fixed but is connected so that when advanced it transmits to the intermediate and driven members.

The central gear 28 rotates with, and constitutes part of the intermediate element of the invention. It is keyed upon a cylindrical hub 29, and the hub is keyed to the cylindrical member or sleeve 30, which extends lengthwise of the driven shaft, surrounding the reservoir spring 24. The hub 29 is supported on and forms part of a sleeve member 31 directly and loosely surrounding the left end of the driven shaft.

The intermediate member 30 carries two ratchet wheels 32 and 33 for forward and reverse drive respectively, and having oppositely cut teeth. These may be formed in one integral piece with a supporting hub or cylinder 34 which extends to the right for cooperation with reversing devices, it being intended to slide the ratchets axially to render one or the other or both of them operative. Two sets of pawls are shown, the pawls 35 engaging the forward ratchet 32 and the pawls 36 the reverse ratchet 33. All the pawls are shown mounted on the same set of longitudinal carrying studs 37, supported in a non-rotating carrier or frame 38, having a detachable right side or cover 39 for the purposes of assemblage, the studs 37 constituting bolts for holding together the parts of the frame or casing. In order to hold the frame concentric with the intermediate member it is provided with a hub 40 integral with the casing 38 and a hub 41 integral with the casing cover 39, these hubs engaging loosely on the parts concentrically within them respectively. These parts are positioned against endwise movement by a rib 42 outstanding from the intermediate sleeve 30.

Each of the pawl carrying studs 37 is shown as carrying two pawls 35 and 36 and these pawls are somewhat spaced apart on the stud by means of a spacing washer 43. Each pawl 35 has an outstanding pin 44 and each pawl 36 a pin 45, and springs 46 are stretched connectingly from pin to pin so that each spring presses on two pawls for yieldingly forcing them in contact with their respective ratchets.

The pawl carrier or casing 38 is non-rotating, and substantially stationary, and the purpose of each set of pawls being to permit the intermediate member to be rotated in one direction while preventing its rotating reversely. I have found that the action of the invention is rendered more smooth, quiet and efficient if the pawl carrier, instead of being rigidly stationary, is slightly relieved therefrom by a fairly stiff cushioning means. For example, the carrier is shown as provided with upwardly extending lugs 48, supporting a pin 49, on which are connected oppositely acting strong coil springs 50, adjusted to a considerable tension through bolts 51 anchoring their opposite ends to the fixed outer casing 13.

In Fig. 1 both sets of pawls are shown engaging their respective ratchets and therefore the intermediate and driven members are locked against rotation. This adjustment may be useful, for example, when the vehicle is in the garage, and during this adjustment it is possible to operate the engine and planetating devices at testing speeds. For forward drive the ratchet and pawls 32 and 35 are allowed to remain in engagement and the others disengaged, and vice versa. For this purpose the combined ratchets are adjusted axially by means of their extension sleeve 34. This sleeve is shown as provided with a circumferential groove 52 engaged by opposite roller studs 53 provided on a fork 54 fixed to a shaft 55 from which extends a handle 56, by the swinging of which the reversing adjustment may be effected. The actual removal of one set of pawls from their ratchet is by an annular cam 57, which in Fig. 1 is seen between the toothed ratchets 32 and 33 and opposite the pawl spacing sleeve 43. Thus for forward driving it is only necessary to throw the handle 56 to the right in Fig. 1 which throws the cam 57 to the left, the cam thereby coming beneath the reverse pawls 36, as will be clear from Fig. 4, and holding them outwardly in inoperative positions. The forward ratchet 32 with its pawls 35 remain operative, so that the intermediate member can be rotated forwardly by successive impulses, but is prevented from rotating reversely. Thereby the alternate thrusts of the pulsating centrifugal weights 27 are transmitted through the gears 26 and 28 to first rotate forwardly the intermediate member, thus charging the spring with energy, then acting reversely, but without return movement of the intermediate member, since the pawl and ratchet prevents this.

In connection with the spring hereof, which changes in diameter as it is put under stress, I have provided a series of loose bearing rings 60, these being shown surrounding the driven shaft, and adapted to form a stop or abutment against which the contracting spring contacts. This improvement facilitates the action of the spring, since the contraction of the spring against the bearing rings 60 does not impede the further play of the convolutions of the spring, the rings rolling and thus avoiding any binding effect on the spring, or any clutching action, such as would sometimes occur if the spring were contracted directly upon an integral shaft or sleeve. This expedient also preserves the driven shaft against injury by repeated clutching actions of the spring upon its surface, and avoids impeding the proper rotation of the driven shaft. At the end of the series of roller rings 60 is a tapered ring 61, the larger end of which engages snugly with the right end of the reservoir spring, while at the other end of the series the sleeve member 31, similarly tapered performs the same function.

An important feature is the co-action of the pawls and ratchets herein shown. For example, taking the pawls 35 and ratchet 32 it will be noted that the several pawls act not simultaneously but successively in engaging the teeth of the ratchet. This is effected by the spacing of the pawls with relation to the teeth. One of the pawls is shown engaged, and others in different stages toward engagement. The effect of this multiple pawl arrangement is to afford a quick action giving immediate gripping so as to prevent any appreciable turning back of the intermediate member when the transmitted impulse reverses its direction.

In describing the operation of the mechanism hereinabove described I shall assume the case of a motor vehicle propelled by internal combustion engine, although it is not intended to restrict the use of the invention to such machine.

The problems of motor vehicle transmission are largely due to the conditions introduced by the use of the internal combustion or gasolene engine. Such engine constitutes perhaps the most advantageous source of power for motor vehicles. It is also true that in the most usual type of present day motor vehicle the application of this power for driving purposes is accomplished through what is well recognized to be a mechanical makeshift, namely the transmission gears, with a friction clutch between the engine fly wheel and gears. It is necessary to use this makeshift on account of certain peculiarities of the gasolene engine. In the first place the engine must be run at a certain speed, not only to develop power but even to exert effective torque. Therefore it becomes inherent that the engine must be in rotation before it is connected to the machine that it is going to drive. This is the first reason for the friction clutch. In the second place a gasolene engine of reasonable proportions for motor vehicle requirements is not capable in itself of delivering sufficient torque, or in the right way, to meet necessary road or driving conditions. Consequently a gear transmission is employed to give the engine the required mechanical advantage. It is necessary for the operator to shift these gears to change the speed ratio and overcome various driving conditions. In order to shift the gears the engine must first be disconnected from the same, which is the second reason for the friction clutch. It is obvious that if enough gear changes to meet all the various road conditions were supplied the operator would have an extremely inconvenient machine to handle. As a matter of practice with only the customary three speed gear shift, designers endeavor to so construct the machine that gear shifting is eliminated as much as possible. This is a compromise between the necessary resulting evils, and is usually at the cost of engine efficiency. It means a comparatively high speed engine with a large gear reduction at the rear axle. My invention, first of all, eliminates all gear shifting but still embodies the requirement of giving the engine the necessary mechanical advantage. This is accomplished by the fact that as the weight is drawn from the outside to the inside position against centrifugal force, which force is exerted as torque on the driven shaft, it is endowed with a potential energy due to this change of position. This potential energy is used up, as the weight moves from the inside to the outside position, and delivers an assisting torque to the driving parts, using the stationary element, ratchet or pawl, as a fulcrum in exerting this force. It is this delivery of energy to the driving parts through the stationary element that gives the required mechanical advantage, and the high torque delivered to the driven shaft.

Despite many suggested forms of transmission the prevailing one today is that in which a clutch is disengaged, gears then shifted by control levers to alter the ratio, in a step by step manner, followed by reengagement of the clutch, the engine being throttled during these operations. The described shortcomings of such mechanisms are notorious, and I believe have not been satisfactorily overcome. The present invention is believed to be on wholly novel principles and to secure the several advantages and avoid the drawbacks hereinabove referred to.

In describing the forward driving action of the present mechanism it will be presupposed that the reversing lever 56 has been thrown to the right so as to throw the ratchet member with its cam 57 to the left thereby rendering inoperative the left hand pawl and ratchet 33, 36 while leaving operative the pawl and ratchet 32, 35. If the driven and intermediate parts including the central gear 28 were held absolutely against rotation it is clear that the planetating gears 26 would merely rotate about their studs as they are carried bodily around with the driving parts. Without the centrifugal weights, or other retarding of the gears they would simply freely planetate. The presence of the centrifugal weights 27 renders the mechanism operative for driving. This, of course, refers to the phase of operation in which the weights are being forced inwardly, toward the main axis of the system. The centrifugal force pressing each weight outwardly will be very considerable when the fly wheel is at high speed of rotation, and this force on each mass or weight 27 increases in proportion to the square of the rotary speed of the fly wheel. It will be obvious that the centrifugal force, tending to rotate the gears clockwise directly opposes the load on the driven shaft and central gear, which tends to compel the counterclockwise rotation of the planetating gear. By opposing and reducing the planetating rotation of the gear the centrifugal action operates to start the driven parts into rotation or increase their speed. Sometimes the centrifugal force of the weights is sufficient to prevent any planetating motion, in which case the central gear and intermediate and driven parts will turn at the full speed of the fly wheel, everything rotating together substantially as though locked, thus giving unitary speed ratios, with absolutely quiet and effective transmission free from interior play of mechanism.

During such full speed driving the condition of the interior parts may be substantially as follows: Figs. 1 and 3 show the weights 27 as at their outermost point, but under the conditions stated they will stand in a different position, rotated slightly counterclockwise. As shown, the centrifugal force will have no rotary effect; with the weight shifted around so that the radius through its center of mass stands about 45 degrees counterclockwise, the centrifugal pull will effect a substantial pressure against the tendency of the load to planetate the weights. The angular position stated is taken merely at random as the radius might stand at substantially any position between the most outward position and one at right angles thereto. Under any given conditions of torque required by the driven shaft the centrifugal weights will assume a corresponding position, and they will not adhere to a fixed position but will doubtless oscillate slightly, readjusting their positions due to variations of torque. A balance takes place, with the weight pulling in one direction on the planetary gear and the load pulling in the other direction; an increase of load causing self adjustment of the weight until the increasing centrifugal effect again balances the load. Unit ratio drive continues through such variations and adjustments as long as the resistance of the load, and the consequent torque demanded, are not sufficiently great to compel the planetating action of the weights which takes place with reduced ratio drive.

When the driven shaft load is increased to a point too great to be thus driven at full speed under any given condition the speed ratio reduces, which means that the central gear rotates slower than the fly wheel, so that the planetating gears will rotate on their studs, compelling the weights 27 to move inwardly and then outwardly. It is the action under this reduced ratio drive, with the weights moving inwardly and outwardly, that I am about to describe. The present invention is such that self adjustment takes place and whatever the conditions of the load the necessary torque will always be provided, while at the same time the greatest possible speed will always be afforded that is available with the requisite torque. These adjustments take place without the need of human action, the shaft slowing down to the most advantageous speed and receiving the necessary torque to overcome the road conditions; although the operator may of course supplement the readjustment of conditions by means of the throttle, opening it to create increase torque and speed and vice versa.

The mechanism hereof when operating at reduced ratio may be described in one aspect as follows: It comprises the planetating weight which is mounted on the driving member so as to travel around with it and capable of moving inwardly and outwardly, toward and from the main axis of the mechanism, subject to the constant outward pressure of centrifugal force. With this is combined a train of connections, the gears 26 and 28, or any other suitable mechanism, connecting with the driven shaft, such that the resistance of the driven shaft when it is rotating slower than the fly wheel causes the weight to be drawn inwardly, yielding against the pull of centrifugal force, the opposition of the centrifugal force effecting the drive of the driven member. This is the first phase. In the second phase, after the weight has reached its most inward point the centrifugal force reasserts itself thus moving the weight forcibly outward. The connections between the weight and the driven shaft, include a one-way device or pawl and ratchet so that, while the shaft is impelled forward in the first phase it will be held against the reverse action in the second phase. The spring associated with the driven shaft, between the intermediate element and the driven shaft, stores and gives up power so as to give steadiness of driven shaft rotation notwithstanding intermittency of advance of the intermediate element. On its return or outward movement the weight, cooperating with the stationary element, effects a reaction which delivers energy to the driving member or fly wheel, thrusting the same forwardly, thus conserving the energy and increasing the speed and torque in a manner to benefit the transmission to the intermediate and driven members, resulting in substantially increased torque in the latter, accompanying the reduced speed ratio.

In this action the inward and outward play of the centrifugal weight, and the substantial action of centrifugal force thereon, are the essential factors. This is especially true inasmuch as the centrifugal force is very considerable, much more so with modern high speed engines, the actual force increasing as the square of the speed, so that we are dealing with a substantial transmitting force, which forms an effective and quiet part of the transmitting means between the driving and driven shafts.

I believe I am the first to produce a transmission mechanism upon these principles. The operation of the weight while influenced by centrifugal force, as a transmitting means, is not to be confused with the minor influence produced by the revolution of the weight about its stud and the push and pull directly upon the stud thereby effected. While there might be a certain tendency to accelerate or retard the fly wheel, and a certain effect on the driven parts by the inertia of the weight as it moves forwardly and then reversely, these actions are negligible because the planetating weight is only a small fraction of the weight of the fly wheel, and because any forces therein, other than centrifugal force about the main axis, are insignificant as compared with the centrifugal force about the main axis when the fly wheel is rotating at modern high speds. It will be noticed that the weights 27 are large enough to produce considerable centrifugal force, and their planetating centers are placed as far out as possible from the main axis so as thereby to give greater centrifugal force. The modern high speed engine, driving the fly wheel hereof, will moreover give four times the centrifugal force as one rotating at half the speed.

The cycle of actions may be divided into two phases, as already stated, the weights moving toward the main axis during substantially a half rotation, resistance by centrifugal force, after which the action of centrifugal force is reversed, the weights moving outwardly. During the inward motion or transmitting phase the weights are retarding the planetating gear and thereby compelling forward drive of the intermediate member. During the second or restoring phases the centrifugal force would tend to increase the planetating rotation and reversely drive the intermediate member, the pawl and ratchet coming into action however to hold the latter against such reverse movement. In the first phase the driving of the intermediate member increases the tension of and delivers energy into the spring. During the second phase the effect of centrifugal force turning the planetating gears causes a forward thrust on the fly wheel, so that the energy is not lost but is in fact multiplied, giving increased torque to the intermediate and driven parts. The critical points or dead centers where the action changes from one phase to the other will be near the extreme inward and outward points of travel of the weights, but not necessarily exactly at such points as the same may be influenced by the counter-pressure of the spring and other influences. As the weights start inward on the first phase of action the effect of the centrifugal force is at first zero, but increases rapidly as the direction of the centrifugal force shifts laterally from the planetating center, until a point is reached where the resistance of this force is sufficient to overcome the resistance of the load on the driven shaft, or the pressure of the spring on the intermediate parts, upon which the latter will be rotated forwardly and high torque transmitted, which, through the spring, continuously acts upon the driven shaft through both phases of operation. The described alternation of phase continues through cycle after cycle without causing appreciable vibration and without substantial loss of energy.

The function of the spring 24 between the intermediate gear 28 and the driven shaft 20 will now be better understood. The intermediate parts are alternately anchored by the pawl and ratchet and driven forwardly through the centrifugally resisted planetating gears 26. The spring is an equalizer, and is constantly under a stress, which will be more or less, dependent on the road conditions and on the torque or resistance offered by the driven parts. In each cycle the spring will be operated at the driving end to strain the spring and store energy, while at the other end the driven parts draw upon the spring for the energy required to drive the vehicle, giving therefore a continuous and substantially uniform speed. The spring may be a resilient element of any type and in any location between the intermediate member and the vehicle wheels. With some machines, conceivably the spring could be dispensed with, or replaced by a substitute.

With this invention therefore the driven shaft can be driven at less speed and with greater torque than the driving shaft. Manipulating the throttle enables the vehicle to be brought to any desired speed possible under any existing conditions, and thereafter the readjustments of speed ratio and torque are self acting. The adjustment is continuous, without the objections of step-by-step adjustments. With this invention a quite low speed ratio, with corresponding high torque, is attainable; because the turning moment which may be imparted to the driven shaft is porportional to the centrifugal force acting upon the weights 27. The centrifugal force may be greatly increased by speeding up the engine, doubling the speed giving four times the force. Raising the speed from 150 to 1000 multiplies the torque by 45. The most varying conditions therefore can be met, and the entire adjustment performed by manipulating the throttle.

The spring will be maintained under a fairly uniform tension because the period of transmission is the major part of the cycle of action. The inward movement of the weights, and the accompanying rotation of the planetating gears, are relatively slow, and may continue over many complete rotations of the fly wheel, during the whole of which time driving energy will be transmitted to the spring. During the second or return phase of action there is no energy being transmitted to the spring but this phase is very brief in point of time as the weights move outwardly rapidly, inside of a fraction of a rotation of the fly wheel. The torque transmitting action is therefore continuous with the exception of occasional short periods of suspension of action, during which the intermediate parts are anchored and the planetating elements are quickly readjusting themselves for further transmitting action. With a very low speed ratio the brief suspensions of transmission will occur more frequently, but for all ordinary ratios the mechanism is actually transmitting power to the intermediate member for the major portion of the time. When the centrifugal force becomes relatively so great as to give unit ratio this in effect indefinitely prolongs the transmitting period and eliminates the suspension of drive.

A vehicle containing this invention may be started into motion with great ease of action. The engine starts freely at low speed, the centrifugal force then being negligible. The throttle is gradually opened speeding up the engine, and the centrifugal force becomes greater and greater until the point is reached where the intermittent forward thrusts become sufficient to advance the intermediate member. If the vehicle be standing against a resistance it will remain stationary until the increased torque of the engine, operating through the centrifugal weights, will transmit rotation to the intermediate member with greater and greater power, as the throttle is opened, until the torque overcomes the load on the driven shaft. In the case of a vehicle running about twenty-five miles per hour on a level road with the engine say at 1000 R. P. M. there will usually be developed sufficient torque to turn the driven shaft at unitary ratio, the centrifugal force of the weights being more than sufficient to deliver the torque without planetating through the two phases described. If the vehicle now reaches a considerable upgrade so that the driving torque is not sufficient to propel the vehicle at unitary ratio a change of action takes place to give the necessary torque. The added load first temporarily decreases the engine speed. This in turn reduces the centrifugal force and the weights are no longer able to resist their tendency to planetate. The weights are drawn inwardly, passing their neutral position, and entering their second phase, in which they deliver to the fly wheel or engine a forward impulse. This enables the engine to again speed up, thus increasing its efficiency, and since, moreover, energy impulses are being delivered by the centrifugal force to the fly wheel, the torque of the driven shaft or engine will be increased. As the described readjustment takes place, the speed of the driven shaft has become reduced in inverse proportion to the increase of torque. In consequence of these actions a condition of balance between the driving and driven shafts will be automatically reached, and under the readjusted conditions, the vehicle going uphill, the engine will turn with greater torque, delivering the greater energy to the driven shaft, but at a lower speed ratio. As the vehicle approaches the crest of the grade where the torque requirement is reduced, a resulting readjustment will take place by reason of the planetating gears turning more and more slowly, due to the reduction of force required to turn the spring and driven shaft. As soon as the centrifugal force of the weights counterbalances the force requisite to turn the central gear and drive the vehicle, the planetating gears may again cease to rotate, the mechanism coming again to unitary ratio.

From the above explanations it will further be obvious that it is impossible with my invention to accidentally stall the engine, this being due to the fact that, as the speed is reduced, the torque to be delivered by the engine is reduced, in proportion to the square of the speed.

When the car comes to a down grade, and power from the engine is no longer required, the first action will be a tendency of the engine to race, upon which it is merely necessary to shut down the engine throttle.

Thus, it is seen that for all conditions of forward driving the speed of the vehicle may be controlled by merely regulating the engine throttle, the torque required by the driven shaft being automatically adjusted to meet the requirements, and this being accomplished without the necessity of any manipulation of the pedal or hand lever.

For the purpose of reversely driving the vehicle the hand lever 56 is to be thrown forwardly that is to the left in Fig. 1, thus shifting the ratchet member to the right, the cam 57 rendering the pawls 35 inoperative and allowing the reverse pawl and ratchet 33, 36 to come into play. The action is then simply the reverse of the forward drive, the driven shaft being thrust reversely in one phase and the pawl and ratchet holding the parts in the other phase of motion of the centrifugal weights.

The present invention is believed to be novel in many aspects. The underlying principles are believed to be new in this and my prior application already mentioned. Although I have shown a complete mechanism with many features of preference, the underlying principles are considerably broader than the mechanism shown, so that I desire to claim many features of principle, combination and subcombination irrespective of the precise mechanism shown. For example, the centrifugal weights are shown as mounted on planetating members for guiding them in their in and out movements, but they may be guided in various other ways. The purpose of the weights is to constitute a yielding or non-positive connection as part of the transmission between the driving and driven shafts. Broadly these could be replaced by springs, as devised by me in a different embodiment, capable of being put under varying degrees of tension, and arranged alternately to urge forward the driven member and then the driving member while the driven member is held, so that there is no loss of energy. The particular pawl and ratchet herein shown could be replaced by other one-way devices such as the hydraulic device shown in my said prior application.

It will thus be seen that I have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims:

What is claimed is:

1. A variable speed transmission apparatus comprising in combination, a rotating driving member, a yielding and reasserting device carried on said driving member, a rotatable driven member, and a train of connections, between said device and the driven member, including a one-way device controlling the same, whereby rotation is transmitted through said first device, in one direction only, to the driven member, and means for cushioning the action of said one-way device.

2. Apparatus as in claim 1 and wherein the one-way device consists of a pawl-and-ratchet, one of the members of which is stationary and the other carried by the rotating parts, and the cushioning means being applied to the stationary member.

3. In combination, a driving member, a driven member, a member intermediate the two, means whereby the driving member intermittently drives the intermediate member, a one-way device preventing reverse rotation of the intermediate member, and a spring device between the intermediate and driven members, characterized by the spring device having a portion of light resistance and a portion of heavy resistance, whereby a comparatively small torque will act through the spring portion of light resistance to advance the intermediate member sufficiently ahead of the driven member so that on the succeeding phase of operation when the intermediate member is maintained stationary the driven member will receive torque from the intermediate member (through the spring device) in one direction only, whereas in case of large torque the spring portion of heavy resistance becomes active.

4. A variable speed transmission apparatus comprising in combination, a rotating driving member, a rotatable intermediate member, a train of connections, between said driving member and the intermediate member, whereby rotation is transmitted intermittently to the intermediate member, means preventing reverse rotation of the intermediate member, a driven shaft, and a transmitting spring between the intermediate and driven members, the same being compound, with a relatively flexible portion that yields sufficiently to ensure continuous forward transmission, and a relatively stiff portion adapted to operate when the transmitted torque is high, the flexible portion arranged to become taken up and inoperative after a predetermined extent of yielding.

5. A variable speed transmission apparatus comprising in combination, a rotating driving member, a rotatable intermediate member, a train of connections, between said driving member and the intermediate member, whereby rotation is transmitted intermittently to the intermediate member, means preventing reverse rotation of the intermediate member, a driven shaft, a graded transmitting spring between the intermediate and driven members, the same being helical, and means for limiting the yield of the spring under strain, comprising separate circular members, as rings 60, arranged concentrically with the spring.

6. Apparatus as in claim 4 and wherein the means for the taking up of the flexible spring portion consists in a series of rings concentric with the spring.

7. Apparatus as in claim 3 and wherein a series of loose rings are arranged adjacently to and concentrically with the light resistance portion of the spring, adapted to be contacted by the spring upon excessive strain.

In testimony whereof, I have affixed my signature hereto.

JOHN REECE.